Dec. 3, 1963 J. GREGG ETAL 3,112,935
VEHICLE SUB-FRAME HAVING A CASTER AXLE
Filed Oct. 21, 1959 2 Sheets-Sheet 2
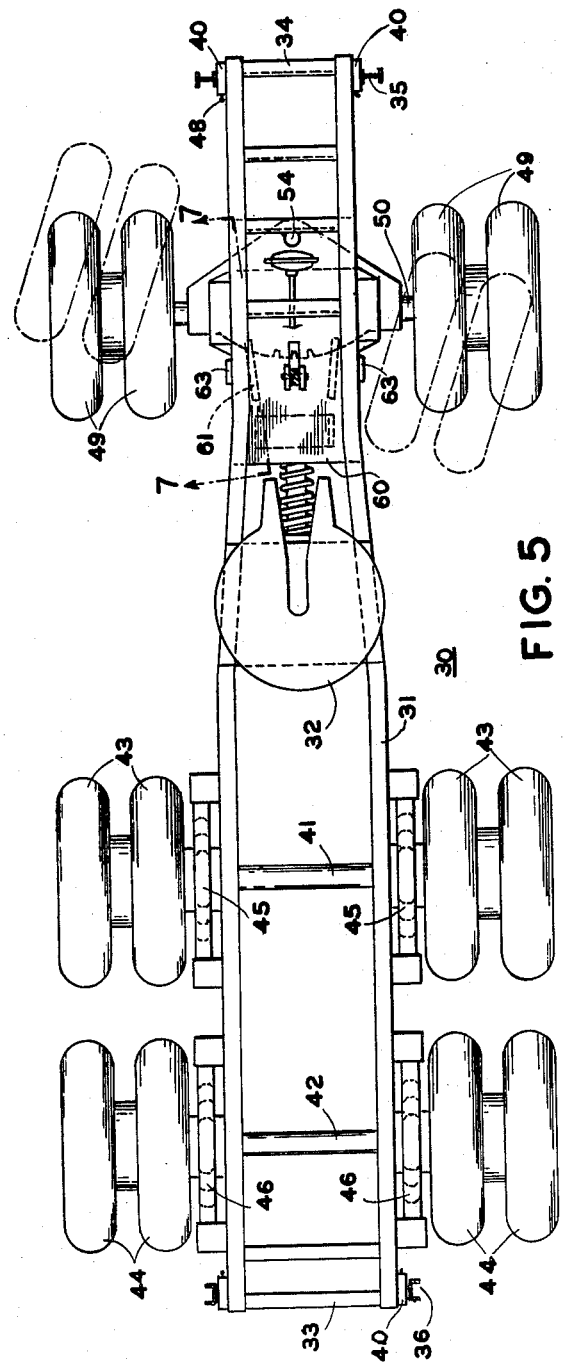
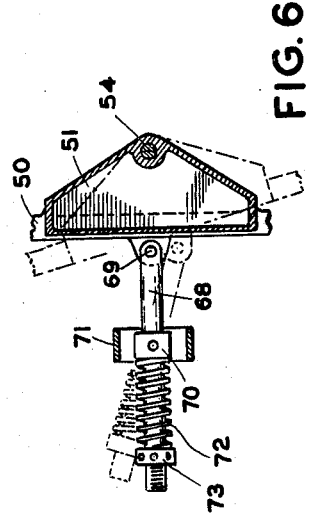
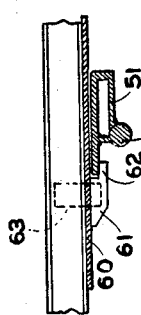
INVENTORS
Joseph Gregg
BY William Gregg
John S. Pyle
Shoodling and Krost
ATTORNEYS United States Patent Office 3,112,935
Patented Dec. 3, 1963

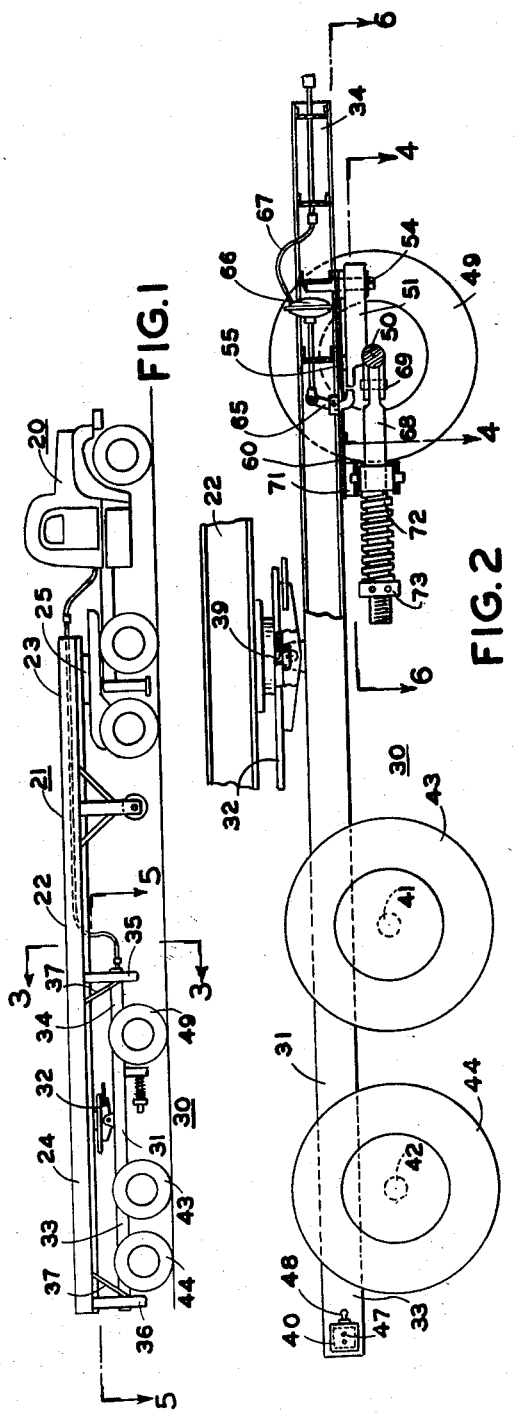

3,112,935
VEHICLE SUB-FRAME HAVING A CASTER AXLE
Joseph Gregg, 3365 Clayton Ave., Cleveland 20, Ohio; William Gregg, 3020 Quigley Ave., Cleveland, Ohio; and John S. Pyle, 10310 Harvard Ave., Cleveland, Ohio
Filed Oct. 21, 1959, Ser. No. 847,805
7 Claims. (Cl. 280—81)

The invention relates in general to road vehicles and more particularly to a sub-frame having a caster axle for the rearward end of a main or primary motor vehicle trailer. The present invention has wide application with respect to the kind and type of road vehicle to which it may be adapted and the following is only one of the specific embodiments in which it may be illustrated. It will be noted that the present invention has been shown in conjunction with a tractor-trailer unit commonly utilized in the motor transportation field.

An object of the invention is to provide a sub-frame having a caster axle for the rearward end portion of a vehicle trailer whereby at least the caster axle may be pivotally mounted to aid in maneuvering the vehicle.

Another object of the invention is to prevent sideward skidding of the wheels as much as possible when making a turn.

Another object of the invention is to provide a sub-frame having a caster axle for the rear end portion of the vehicle trailer to aid in maneuvering the vehicle with a minimum amount of wear or damage to the tires of the vehicle.

Another object of the invention is to aid in maneuvering the vehicle.

Another object of the invention is to resiliently constrain said caster axle in a normal running position.

Another object is to releasably lock the caster axle in a fixed position.

Other objects and a fuller understanding of the invention may be had by referring to the following description and claims, taken in conjunction with the accompanying drawing, in which:

FIGURE 1 is a side elevational view of a road vehicle having a sub-frame and caster axle embodying the features of the present invention;

FIGURE 2 is a side elevational view of the sub-frame and caster axle assembly;

FIGURE 3 is a cross-sectional view taken along the line 3—3 of FIGURE 1 in which certain parts are omitted for clarity;

FIGURE 4 is a cross-sectional view taken along the line 4—4 of FIGURE 2 in which certain parts are omitted for clarity;

FIGURE 5 is a plan view of the sub-frame and caster axle taken along the line 5—5 of FIGURE 1;

FIGURE 6 is a cross-sectional plan view taken along the line 6—6 of FIGURE 2 in which certain parts are omitted for clarity; and FIGURE 7 is a cross-sectional view in elevation taken along the line 7—7 of FIGURE 5, showing principally a stabilizing guide member.

With reference to FIGURE 1 of the drawing, the reference character 20 indicates a tractor employed for hauling a main trailer indicated by the reference character 21 which comprises a main frame 22 having a forward end portion 23 and a rearward end portion 24. The forward end portion 23 of the main frame is provided to be carried by a main fifth wheel indicated by the reference character 25. The arrangement illustrated is a tractor-trailer unit commonly utilized in the motor transport field. As shown in FIGURE 3, the main frame 22 is provided with two centrally spaced longitudinal beams 26 which extend longitudinally of the center of the main frame and two side longitudinal beams 27 which extend longitudinaly along the side of the main frame.

The sub-frame and caster axle is indicated generally by the reference character 30 in FIGURE 1, and comprises a sub-frame 31 and a set of rear wheel assemblies 43 and 44 and a caster axle assembly 49. The set of rear wheel assemblies 43 and 44 may be carried by conventional springs 45 and 46 respectively. The construction of the rear wheel assemblies 43 and 44 and the springs 45 and 46 respectively therefor may be of any suitable design and construction. The axles for the rear wheel assemblies 43 and 44 are indicated by the reference characters 41 and 42 respectively. These axles are fixedly mounted and are disposed substantially perpendicular to the longitudinal axis of the sub-frame.

The sub-frame 31 has a rearward end portion 33 and a forward end portion 34. The intermediate portion of the sub-frame is provided with a fifth wheel construction indicated by the reference character 32 which is adapted to engage a pin 39 carried by the main frame 22. The fifth wheel connection 32 may be of any standard design and the purpose of the fifth wheel connection is to enable the sub-frame to be fastened below the main frame whereby the sub-frame 31 may rock relative to the main frame. Extending downwardly from the main frame 22 are two guide brackets 35 and 36 which are substantially identical and engageable by the sub-frame. The guide bracket 35 is adapted to be engaged by the forward end of the sub-frame 31 and the guide bracket 36 is adapted to be engaged by the rearward end of the sub-frame. As illustrated in FIGURE 3, the guide brackets comprise two spaced vertical members between which the sub-frame 31 may slide up-and-down. In order to facilitate the movement of the sub-frame 31 up-and-down between the two spaced vertical guide brackets, the sides of the sub-frame are provided with wear blocks 40 which may be of any suitable material. In this invention, the wear blocks 40 are preferably hollow and are provided with small lubricant openings 47 which lubricate the vertical guide brackets. Each of the wear blocks 40 may be provided with an Alemite connection 48 whereby the hollow wear blocks 40 may be filled with a suitable lubricant. As shown in FIGURE 3, the two spaced guide brackets may be welded or otherwise connected to the underneath side of the two spaced longitudinal beams 26. The guide brackets may be braced by suitable brace members 37 which are connected at their upper ends to the two vertical guide brackets.

The caster axle for the forward wheel assembly 49 is indicated by the reference character 50 and is adapted to be pivotally mounted to the sub-frame and disposed to be pivoted in directions at variable angles with respect to the longitudinal axis of the sub-frame. As shown in FIGURES 2 and 4, the caster axle 50 has an axle plate 51 connected thereto. The plate 51 has a forward side portion 52 and a rearward side portion 53. The forward side portion 52 is pivotally connected to the sub-frame by means of a pivot pin 54. The axle 50 is to the rear of the pivot pin 54 and the assembly comprises a caster axle. When traveling in a forward direction the axle 50 assumes a pivot position with respect to the pivot 54 as determined by the forces acting on the axle. The caster axle plate 51 is provided with stabilizing blocks 55 which stabilize the axle in substantially a horizontal plane under the sub-frame 31. As shown in FIGURES 5 and 7, the underneath side of the sub-frame 31 is provided with a plate 60 which extends thereacross from one side of the sub-frame to the other. The stabilizing blocks 55 slide against the underneath side of the plate 60. Extending downwardly from the plate 60 are two spaced stabilizing guide members 61 (see FIGURE 7) which may be suitably welded or otherwise fastened to the plate 60. The forward sides of the stabilizing guide member 61 comprises a support finger 62 which fits under the rearward side portion 53 of the wheel plate 51. The support finger 62 in combination with the stabilizing blocks 55 function to stabilize the axle plate 51 underneath of the sub-frame 31. Each side of the sub-frame 31 is provided with downwardly extending stop members 63 against which the rearward side portion 53 of the axle plate 51 may engage to limit the amount that the axle 50 may be turned. These stop members 63 are shown in FIGURES 4, 5 and 7.

The rearward edge of the rearward side portion 53 is provided with a series of notches 64 into which fits a releasable lever latch 65. As shown in FIGURE 2 the lever latch 65 may be actuated by an actuating unit 66 controlled by a fluid line 67 operated by the driver of the tractor 20. When the actuating unit 66 is operated, the level latch 65 engages one of the noches 64 for holding the caster axle in a fixed position.

As shown in FIGURES 2 and 6, the caster axle 50 has a restraining arm 68 pivotally connected thereto by means of a pivot pin 69. The restraining arm 68 extends in a rearward direction under the sub-frame 31 and is provided with a spring 72 which normally restrains the caster axle in a transverse position substantially perpendicular to the longitudinal axis of the sub-frame. Surrounding the restraining arm 68 on the forward side of the spring is a swivel block 70 which is carried by a bracket 71 connected to the underneath side of the sub-frame. On the rearward end of the spring 72 is an adjustable nut 73 for adjusting the tension of the spring.

In operation when the vehicle is traveling on the road, the pivotally mounted caster axle 50 is constrained by the spring 72 in a normal transverse running position, which is substantially perpendicular to the longitudinal axis of the sub-frame. In addition, the caster axle may or may not be locked in its normal position by the latch lever 65 engaging the center notch 64.

When running or turning a corner in regular travel, the latch lever 65 may be unlatched whereby the pivotally mounted caster axle 50 may turn under the restraining force of the spring and thereby prevent the tires on the front wheel assembly 49 from being skidded sidewise during the turning operation. When backing up, the latch lever 65 may be engaged with either one of the notches 64, usually the center notch, and this holds the pivotally mounted caster axle 50 in a fixed position so that the vehicle may be easily maneuvered in backing up. The pivotally mounted caster axle 50 also aids in maneuvering the vehicle when turning a sharp corner as well as when backing up.

Although this invention has been described in its preferred form with a certain degree of particularity, it is understood that the present disclosure of the preferred form has been only by way of example and that numerous changes in the details of construction and the combination and arrangement of parts may be resorted to without departing from the spirit and the scope of the invention as hereinafter claimed.

What is claimed is:

1. In a road vehicle including a main frame having a rear end portion, the combination of a sub-frame for said rear end portion of said main frame, frame pivot means for pivotally mounting said sub-frame under the rear end portion of the main frame, guide means carried by said main frame and engageable by said sub-frame, said guide means longitudinally aligning said sub-frame under said main frame, said sub-frame having a rearward portion to the rear of said frame pivot means and having a forward portion in advance of said frame pivot means, first wheel means for supporting said rearward portion of said sub-frame, fixedly mounted axle means for said first wheel means, said fixedly mounted axle means disposed substantially perpendicular to the longitudinal axis of said sub-frame, second wheel means for said forward portion of said sub-frame, pivotally mounted caster axle means for said second wheel means, said pivotally mounted caster axle means disposed to pivot in directions at variable angles with respect to the longitudinal axis of said sub-frame, resilient means connected to said pivotally mounted caster axle means to constrain said pivotally mounted caster axle means in a normal transverse position substantially perpendicular to the longitudinal axis of said sub-frame, and releasable lock means engageable with said pivotally mounted caster axle means to lock said pivotally mounted caster axle means in said normal transverse position.

2. In a road vehicle including a main frame having a rear end portion, the combination of a sub-frame for the rear end portion of the main frame, frame pivot means for pivotally mounting said sub-frame under the rear end portion of the main frame, guide means carried by said main frame and engageable by said sub-frame, said guide means longitudinally aligning said sub-frame under said main frame, said sub-frame having a rearward portion to the rear of said frame pivot means and having a forward portion in advance of said frame pivot means, first wheel means for supporting said rearward portion of said subframe, first axle means for said first wheel means, said first axle means fixedly mounted substantially perpendicular to the longitudinal axis of said sub-frame, second wheel means for said forward portion of said sub-frame, second axle means comprising caster axle means for said second wheel means, said caster axle means comprising a transverse axle member extending across said sub-frame, axle pivot means for pivotally connecting said transverse axle member to said sub-frame whereby said caster axle means may be pivoted in directions at variable angles with respect to the longitudinal axis of said sub-frame, said axle pivot means located substantially midway transversely of said sub-frame and longitudinally forward of said transverse axle member, resilient means cooperating with said transverse axle member tending to maintain said caster axle means in a normal transverse position substantially perpendicular to the longitudinal axis of said sub-frame, and releasable lock means engageable with said pivotally mounted caster axle means to lock same in said normal transverse position.

3. A road vehicle having a main frame and a rear end portion, including in combination a sub-frame, frame pivot means for pivotally mounting said sub-frame under the rear end portion of the main frame, guide means carried by the main frame and engageable by said sub-frame, said guide means and said frame pivot means longitudinally aligning said sub-frame under said main frame, said sub-frame having a rearward portion in the rear of said frame pivot means and having a forward portion in advance of said frame pivot means, first wheel means for supporting said rearward portion of said sub-frame, first axle means for said first wheel means, said first axle means fixedly mounted substantially perpendicular to the longitudinal axis of said sub-frame, second wheel means for said forward portion of said sub-frame, second axle means comprising caster axle means for said second wheel means, said caster axle means comprising a transverse axle member extending across said sub-frame, said transverse axle member having a front side portion and a rearward side portion, axle pivot means for pivotally connecting said front side portion of said transverse axle member to said sub-frame whereby said caster axle means may be pivoted in directions at variable angles with respect to the longitudinal axis of said sub-frame, resilient means connected to said rearward side portion of said transverse axle member to constrain said caster axle means in a normal transverse position substantially perpendicular to the longitudinal axis of said sub-frame, and releasable lock means engageable with said rearward side portion of said transverse axle member to lock said pivotally mounted caster axle means in said normal transverse position.

4. In a road vehicle including a main frame having a rear end portion, the combination of a sub-frame for the rear end portion of the main frame, movable means for mounting said sub-frame under the rear end portion of the main frame, guide means carried by the main frame and engageable by said sub-frame, said guide means longitudinally aligning said sub-frame under the main frame, wheel means for said sub-frame, pivotally mounted caster axle means for said wheel means, said pivotally mounted caster axle means disposed to pivot in directions at variable angles with respect to the longitudinal axis of said sub-frame, resilient means connected to said pivotally mounted caster axle means to constrain said pivotally mounted caster axle means in a normal transverse position substantially perpendicular to the longitudinal axis of said sub-frame, and releasable lock means engageable with said pivotally mounted caster axle means to lock said pivotally mounted axle means in said normal transverse position.

5. A road vehicle having a main frame and a rear end portion including in combination a sub-frame, said sub-frame comprising first and second spaced longitudinally extending members, a fifth wheel connection for pivotally mounting said sub-frame under the rear end portion of the main frame, guide means carried by the main frame for guiding said sub-frame, said guide means comprising first and second generally vertically extending members carried by the main frame and extending on either side of said first and second spaced longitudinally extending members and also comprising third and fourth generally vertically extending members carried by the main frame and residing on either side of said first and second spaced longitudinally extending members a spaced distance from said first and second vertical members, said guide means and said fifth wheel connection longitudinally aligning said sub-frame under said main frame, said sub-frame having a rear end portion in the rear of said fifth wheel connection and having a forward portion in advance of said fifth wheel connection, a first wheel means for supporting said rearward portion of said sub-frame, first axle means for said first wheel means, said first axle means fixedly mounted substantially perpendicular to the longitudinal axis of said sub-frame, second wheel means for said forward portion of said sub-frame, second axle means for said second wheel means, said second axle means comprising an axle mounting plate member to which is fixedly secured said second axle means at a rearward portion thereof, pivot means for pivotally connecting a forward portion of said axle mounting plate member to said sub-frame whereby said second axle means may be pivoted in directions at variable angles with respect to the longitudinal axis of said sub-frame, a restraining arm pivotally connected to a rearward portion of said axle mounting plate member, spring means acting between said restraining arm and said sub-frame to restrain movement of said axle mounting plate member and said second axle means from its normal transverse position substantially perpendicular to the longitudinal axis of said sub-frame and releasable lock means engageable with said rearward portion of said axle mounting plate member to lock the same in said normal transverse position, and control means remotely located from said releasable lock means whereby an operator of the road vehicle may remotely control the releasable lock means.

6. A road vehicle having a main frame and a rear end portion including in combination a sub-frame, said sub-frame comprising first and second spaced longitudinally extending members, pivot means for pivotally mounting said sub-frame under the rear portion of the main frame, guide means carried by the main frame for guiding said sub-frame, said guide means comprising first and second members carried by the main frame and extending on either side of said first and second spaced longitudinally extending members and also comprising third and fourth members carried by the main frame and residing on either side of said first and second spaced longitudinally extending members a spaced distance from said first and second members, said guide means longitudinally aligning said sub-frame under said main frame, said sub-frame having a rear end portion in the rear of said pivot means and having a forward portion in advance of said pivot means, a first wheel means for supporting said rearward portion of said sub-frame, first axle means for said first wheel means, said first axle means fixedly mounted substantially perpendicular to the longitudinal axis of said sub-frame, second wheel means for said forward portion of said sub-frame, second axle means for said second wheel means, said second axle means comprising an axle mounting member means to which is fixedly secured said second axle means, another pivot means for pivotally connecting a portion of said axle mounting member means to said sub-frame whereby said second axle means may be pivoted in directions at variable angles with respect to the longitudinal axis of said sub-frame, restraining means connected to a portion of said axle mounting member means, spring means acting with said restraining means to restrain movement of said axle mounting member means and said second axle means from its normal transverse position substantially perpendicular to the longitudinal axis of said sub-frame.

7. In a road vehicle the combination of a sub-frame, wheel means for said sub-frame, pivotally mounted caster axle means for said wheel means, said caster axle means comprising a mounting member having a forward portion, an axle member secured to said mounting member, pivot means at said forward portion of said mounting member for pivotally connecting the same to said sub-frame, a restraining arm pivotally connected to said caster axle means, pivot means pivotally connecting said restraining arm to said sub-frame, spring means acting between said restraining arm and said sub-frame thereby exerting a force tending to maintain said caster axle means in a normal transverse position.

References Cited in the file of this patent
UNITED STATES PATENTS

| | | |
|---|---|---|
| 1,212,949 | Hesse | Jan. 16, 1917 |
| 2,333,853 | Fellabaum | Nov. 9, 1943 |
| 2,361,166 | Ayers | Oct. 24, 1944 |
| 2,373,398 | Hoobler | Apr. 10, 1945 |
| 2,433,268 | Fellabaum | Dec. 23, 1947 |
| 2,757,373 | Marrie | July 31, 1956 |
| 2,919,928 | Hoffer | Jan. 5, 1960 |

FOREIGN PATENTS

| | | |
|---|---|---|
| 1,152,033 | France | Oct. 26, 1957 |